Patented June 15, 1926.

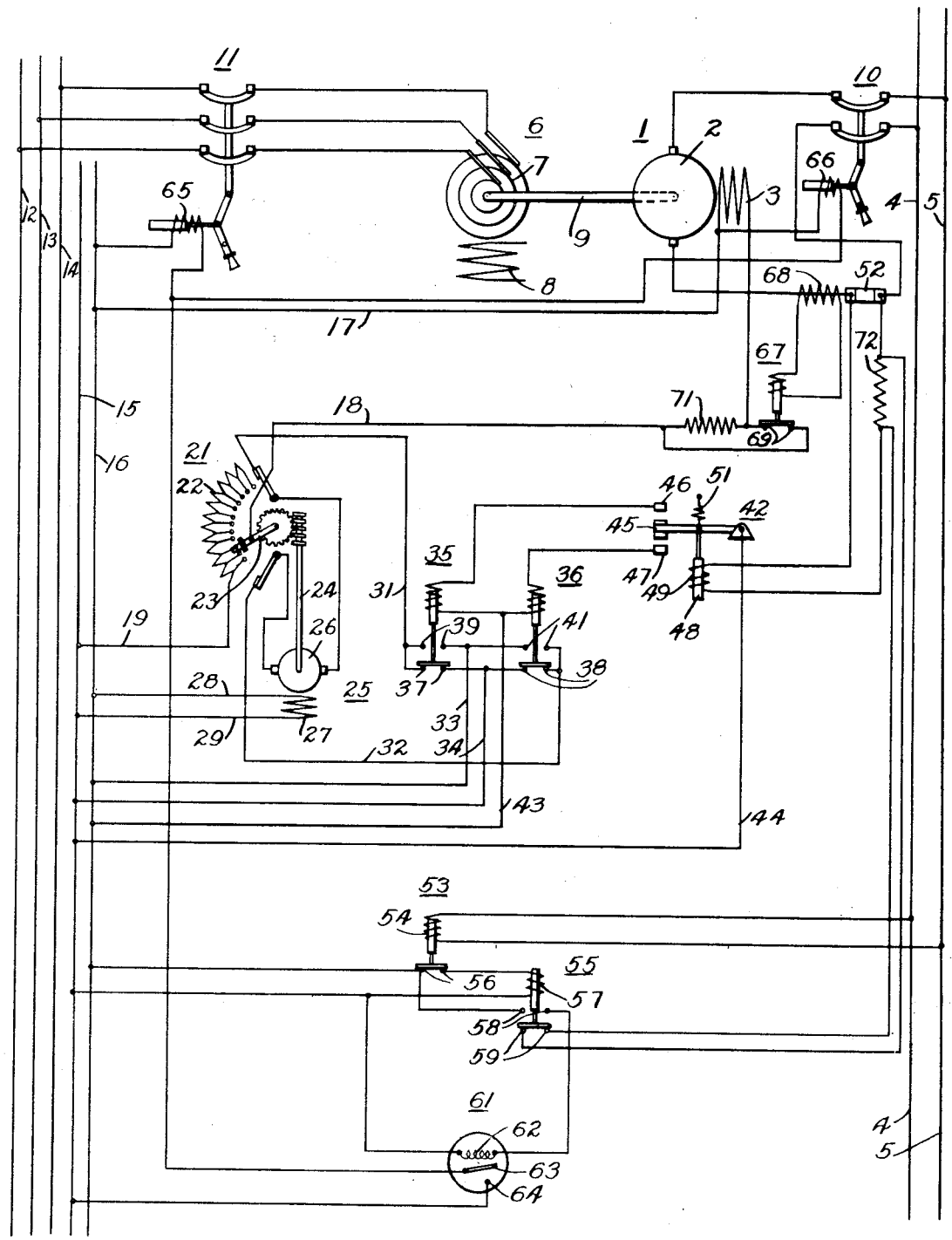

1,588,631

UNITED STATES PATENT OFFICE.

HAROLD W. SMITH AND FRANK M. BILLHIMER, OF WILKINSBURG, PENNSYLVANIA, ASSIGNORS TO WESTINGHOUSE ELECTRIC & MANUFACTURING COMPANY, A CORPORATION OF PENNSYLVANIA.

REGULATOR SYSTEM.

Application filed June 2, 1924. Serial No. 717,311.

This invention relates to regulator systems and more particularly to regulator systems for maintaining a predetermined load on a direct-current generator.

One object of our invention is to limit the generator output to a normal kilowatt load within a predetermined range in voltage of the supply circuit, and to increase the generator load above the normal value for a limited time, upon a considerable decrease in the supply circuit voltage.

Another object of our invention is to regulate the load upon a generator to obtain the maximum permissible endurance, or heating, of the machine, due to an increased load demand upon the machine, before it will be disconnected from the line.

In a number of installations of direct-current generators, the load may be temporarily thrown upon one of the generators on account of other generators being disconnected. Such load may be destructive to the generator if maintained for a considerable time. It is desirable, however, in order to continue service, that the generator carry such excess load for a limited time before being disconnected, in order to give an opportunity to reconnect the other sources of supply to the load supply line.

It has been proposed, in this connection, to use a differentially-wound direct-current generator, the series field winding of which could be short-circuited so long as the current would not exceed full load value. The differential machine would require a voltage regulator to keep the voltage constant from no load to full load, as otherwise it would have a drooping characteristic. An additional disadvantage resides in the fact that the differential windings give no protection against short-circuits, since if a short-circuit occurs, the contactor shunting the negatively-wound series field winding opens and the load current is diverted through the differential winding. Because of the time required for the current and magnetic flux to reach its definite or its final value following any change, and because the differential winding opposes the excitation of the shunt winding, the flux change is too slow to protect the system.

In accordance with our invention, a constant-current regulator is used to govern the field excitation of the generator which is of the shunt-wound type. The current regulator will keep the current at a predetermined value under normal conditions, but in the event of a sudden short-circuit, a special short-circuit detector will suddenly introduce a resistance into the generator field circuit, thus reducing the direct-current voltage. The short-circuit detector consists of a current transformer in the direct-current circuit, the secondary of which is connected to a quick-acting relay. This relay is responsive, therefore, only to heavy induced currents, such as are incident to a short-circuit upon the line. Any gradual changes in load will be taken care of by the action of the current regulator.

In case of a drop in the voltage of the direct-current or load circuit, as would be caused when a large amount of power was being drawn from the direct-current generators, the voltage relay operates to change the setting of the current regulator to maintain an increased excitation of the generator for a limited time, causing it to supply an overload current to the line. Should this increased load be continued, a time-delay relay will operate to disconnect the generator from the line prior to excessive heating, which might injure the machine.

Our invention will be better understood with reference to the accompanying drawing, in which the single figure is a diagrammatic view of circuits and apparatus used in an embodiment of my invention.

Referring to the drawing, a direct-current generator 1, provided with an armature winding 2 and a field winding 3, is connected to supply energy to the load supply circuit 4—5. The generator may be driven by an alternating-current synchronous motor 6, provided with an armature winding 7 and field winding 8, by means of the shaft 9. A switch or circuit breaker 10 is provided to connect the generator 2 to the load circuit 4—5. A switch or circuit breaker 11 is provided to connect the synchronous motor to a three-phase source of alternating-current supply 12—13—14.

The field winding 3 of the generator may be energized from any suitable source 15—16, by means of the conductors 17, 18 and 19. A motor-operated rheostat 21 is provided in the generator field circuit. The rheostat 21 comprises a resistor 22 and a movable arm 23 operated from the shaft 24 by means of a pilot motor 25. The pilot motor 25 is provided with an armature winding 26 and a field winding 27. The field winding may be energized from the direct-current source 15—16, by means of conductors 28 and 29, while the armature winding 26 may be energized from the same source through conductors 31, 32, 33 and 34, in accordance with the operation of relays 35 and 36.

In the position illustrated in the drawing, the relays 35 and 36 are not energized and connect the motor armature to a dynamic breaking circuit through contact members 37 and 38. Upon energization of one of the relays 35 or 36, contact members 39 or 41 will be closed, connecting one side of the motor armature through conductor 33 to the supply conductor 16, thus energizing the pilot motor 25 to operate in one direction or the other.

The relays 35 and 36 are controlled in accordance with the operation of the constant-current regulator 42, which operates to connect the relays through conductors 43 and 44 to the direct-current source 15—16, as the contact 45 engages the contact 46 or the contact 47. The constant-current regulator is provided with a core member 48 and a coil 49 for actuating the same against the tension of a coil spring 51. The coil 49 may be energized from a shunt 52, or from the interpole winding of the generator. A voltage relay 53 is connected to the supply circuit conductors 4—5 and is provided with an operating coil 54 which normally holds the relay contact member in its raised position.

If the load increases above a predetermined maximum value, thus causing the voltage to drop below a predetermined value, the voltage relay 53 will operate an auxiliary relay 55 by closing a circuit through the contact members 56, and energizing the winding 57. Energizing the relay 55 will cause the relay armature to be raised, opening the circuit through contact members 59 and closing the circuit through contact members 58. The closing of contact members 58 causes the operating coil 62 of a time-delay relay 61 to become energized thereby operating the relay to close the contact members 63 and 64 after a predetermined time, and thus to energize the winding 65 of the switch 11 and the winding 66 of the switch 10. Switches 10 and 11, therefore, may be operated to disconnect the generator 2 from the load circuit 4—5 and to disconnect the synchronous motor 6 from the line.

At the same time that the time-delay relay is energized upon closing the circuit through contact members 58, opening the contact members 59 will insert a resistor 72 in circuit with the constant-current regulator 42, thus changing the setting of this regulator and causing it to maintain an increased field excitation upon the generator 1. Should a sudden short-circuit of the generator occur, the short-circuit detector 67, which comprises a relay energized from the series transformer 68, would operate to open the circuit through contact members 69 and thus insert a resistor 71 in series with the generator field winding 3, causing a decrease in the generator excitation.

The operation of the system is as follows: Assuming the generator to be in operation, the constant-current regulator 42 is energized in accordance with the current flowing through the ammeter shunt 52 and controls the operation of the pilot motor 25 to vary the operation of the field rheostat 21, thus maintaining a constant load upon the generator. Should the voltage of the load circuit 4—5 drop below a pre-determined value, the relay 53 would be energized and operate the auxiliary relay 55, inserting the resistor 72 in series with the constant-current regulator, causing it to regulate for an increased load upon the generator. The operation of the auxiliary relay 55 would also energize the time-delay relay 61, and should the decreased voltage of the supply circuit be maintained, the time-delay relay would energize the coils 65 and 66 of circuit breakers 10 and 11, causing them to shut down the generator. Also, in case of a short-circuit of the generator or load circuit, the circuit detector 67 would operate to insert the resistor 71 in the generator field circuit, thus reducing the generator voltage.

Many modifications of the embodiment of this invention may be made within the spirit thereof, and we do not wish to be limited other than by the scope of the appended claims.

We claim as our invention:

1. In combination, a power supply circuit, a direct-current generator connected thereto, said generator being provided with a field winding, a constant-current regulator actuated in accordance with the generator current for controlling the energization of said field winding, and means controlled in accordance with said power circuit conditions for changing the setting of said current regulator.

2. In combination, a power supply circuit, a direct-current generator connected thereto, said generator being provided with a field winding, a constant-current regulator actuated in accordance with the generator current for controlling the energization of said field winding, a time-delay device for interrupting the operation of said generator, and means controlled in accordance with said power circuit voltage for changing the setting of said current regulator and for initiating the operation of said time-delay device.

3. In combination, a direct-current generator having a field magnet winding, a power supply circuit to which said generator is connected, a current regulator for maintaining a predetermined load on said generator, and means operated in accordance with power circuit conditions for changing the setting of said current regulator.

4. In combination, a direct-current generator having a field magnet winding, a power supply circuit to which said generator is connected, a current regulator for maintaining a predetermined load on said generator comprising a relay connected to be energized in accordance with the generator current, a resistor connected in series circuit relation with said relay, means normally operative to short-circuit said resistor, and means operated in accordance with power circuit conditions for opening said short circuit.

5. In a regulator system the combination with a power supply circuit and a generator connected thereto provided with a field magnet winding, of a constant current regulator for said generator comprising a control relay energized in accordance with the generator current for controlling the energization of said field winding, a resistor element, and means actuated in accordance with the voltage of said supply circuit for inserting said resistor element in series circuit relation with said relay.

6. In a regulator system the combination with a power supply circuit and a generator connected thereto provided with a field magnet winding, of a constant-current regulator for said generator comprising a control relay energized in accordance with the generator current for controlling the energization of said field winding, means for rendering the generator inoperative comprising a time-delay element, a resistor, and means actuated in accordance with the supply circuit voltage for connecting said resistor in or out of circuit with said relay and for controlling the energization of said time-delay element.

7. In a regulator system the combination with a power supply circuit and a generator connected thereto provided with a field magnet winding, of a constant-current regulator for said generator comprising a control relay energized in accordance with the generator current for controlling the energization of said field winding, a circuit for said relay, and means actuated in accordance with the supply circuit voltage for varying the resistance of said relay circuit.

8. In a regulator system the combination with a power supply circuit and a generator connected thereto, of a constant-current regulator for said generator, electro-responsive means for varying the setting of said regulator, and means actuated in accordance with power circuit conditions for controlling said last-named means.

9. In a regulator system the combination with a power supply circuit and a generator connected thereto, of a constant-current regulator for said generator, electro-responsive means for varying the setting of said regulator, means for interrupting the operation of said generator comprising a time-delay control element, and means actuated in accordance with power circuit conditions for controlling the energization of said electro-responsive means and said time-delay element.

10. In combination, a direct-current generator, a load circuit supplied by said generator, means for limiting the generator load under normal load circuit conditions, and means operable upon low load circuit voltage conditions for maintaining a heavy overload on said generator for a predetermined time.

11. In combination, a direct-current generator, a load circuit supplied by said generator, load regulating means for maintaining normal generator load, and means operable upon low load circuit voltage conditions for maintaining a predetermined overload on said generator for a predetermined time.

12. In combination, a direct-current generator, a load circuit supplied by said generator, load regulating means for normally maintaining the generator load within a predetermined range, and means operable upon low load circuit voltage for modifying the control of said load regulating means to maintain an overload on said generator for a predetermined time.

In testimony whereof, we have hereunto subscribed our names this 31st day of May, 1924.

HAROLD W. SMITH.
FRANK M. BILLHIMER.